United States Patent
Goetzelmann

(10) Patent No.: US 11,462,824 B2
(45) Date of Patent: Oct. 4, 2022

(54) COVER ELEMENT

(71) Applicant: Magna Exteriors GmbH, Sailauf (DE)

(72) Inventor: Johannes Goetzelmann, Altertheim (DE)

(73) Assignee: MAGNA EXTERIORS GMBH, Sailauf (DE)

( * ) Notice: Subject to any disclaimer, the term of this patent is extended or adjusted under 35 U.S.C. 154(b) by 458 days.

(21) Appl. No.: 16/678,750

(22) Filed: Nov. 8, 2019

(65) Prior Publication Data
US 2020/0153093 A1    May 14, 2020

(30) Foreign Application Priority Data

Nov. 12, 2018   (DE) .......................... 102018219294.4

(51) Int. Cl.
| | |
|---|---|
| H01Q 1/42 | (2006.01) |
| B60R 13/00 | (2006.01) |
| G01S 7/03 | (2006.01) |
| G01S 13/931 | (2020.01) |
| H01Q 1/02 | (2006.01) |
| H01Q 1/32 | (2006.01) |
| H05B 3/34 | (2006.01) |
| B60S 1/66 | (2006.01) |
| G01S 7/40 | (2006.01) |
| H01Q 1/00 | (2006.01) |

(52) U.S. Cl.
CPC ........... *H01Q 1/425* (2013.01); *B60R 13/005* (2013.01); *G01S 7/03* (2013.01); *G01S 13/931* (2013.01); *H01Q 1/02* (2013.01); *H01Q 1/3233* (2013.01); *H01Q 1/3283* (2013.01); *H05B 3/34* (2013.01); *B60S 1/66* (2013.01); *G01S 7/4047* (2021.05); *H05B 2203/013* (2013.01)

(58) Field of Classification Search
None
See application file for complete search history.

(56) References Cited

U.S. PATENT DOCUMENTS

| | | | | |
|---|---|---|---|---|
| 3,718,535 A | * | 2/1973 | Armstrong | H05B 3/86 219/203 |
| 2002/0011946 A1 | | 1/2002 | Artis et al. | |
| 2004/0219366 A1 | * | 11/2004 | Johnson | B32B 27/365 428/480 |

(Continued)

FOREIGN PATENT DOCUMENTS

| | | |
|---|---|---|
| CN | 101690385 A | 3/2010 |
| DE | 10044971 A1 | 3/2002 |
| DE | 10044971 A1 | 4/2002 |

(Continued)

OTHER PUBLICATIONS

German Search Report regarding German Application No. 10 2018 219 294.4 dated Oct. 28, 2019 (?)—No English Translation.

(Continued)

*Primary Examiner* — Bernarr E Gregory
(74) *Attorney, Agent, or Firm* — Dickinson Wright PLLC

(57) ABSTRACT

A cover element is provided for a radome in a vehicle, which has an at least partially metallised film which is over-moulded on a front side with a layer of a first plastic and back-moulded on a back side with a cover layer of the second plastic, wherein a heating element is provided on the back side or front side of the at least partially metallised film.

20 Claims, 3 Drawing Sheets

(56) References Cited

U.S. PATENT DOCUMENTS

Figure 1A:
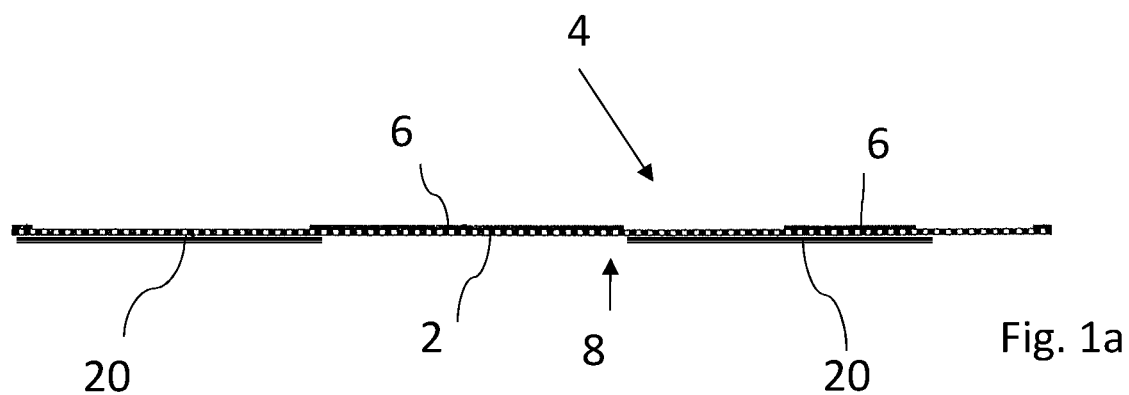

2014/0218263 A1* 8/2014 Burdenski .............. H01Q 1/422
156/278

FOREIGN PATENT DOCUMENTS

| DE | 10156699 | A1 | | 6/2003 | |
|---|---|---|---|---|---|
| EP | 1902902 | A1 | * | 9/2007 | ........... H01Q 1/3233 |
| EP | 1902902 | A1 | | 3/2008 | |

OTHER PUBLICATIONS

EP Search Report; Appl. No. 19206815.3; dated Mar. 20, 2020; 7 pages.

* cited by examiner

COVER ELEMENT

CROSS-REFERENCE TO RELATED APPLICATION

This application claims the benefit and priority of German Patent Application No. 102018219294.4, filed Nov. 12, 2018. The entire disclosure of the above application is incorporated herein by reference.

FIELD OF THE INVENTION

The present invention is related to a cover element for an opening of a vehicle, and a method for producing a cover element for an opening of a vehicle.

BACKGROUND OF THE INVENTION

This section provides background information related to the present disclosure which is not necessarily prior art.

Functional elements, such as e.g. sensors and similar, are usually arranged in a body or outer cladding of the vehicle. To protect these functional elements and for aesthetic reasons, it may furthermore be provided to cover or close such openings for the functional elements with suitable cover elements.

In the case of sensors working with radar waves, precautions must be taken to avoid icing in winter. It must be ensured that no ice layer can form in front of the emission zone of the sensor, else the sensor is no longer functional. For this, it is known to provide a heating device for the sensor surface.

German Patent Application Publication No. 102011107216A1 describes a radome of a transmitter-receiver for radar waves in a motor vehicle. A planar heating device is arranged between a carrier layer and a cover layer of the radome. In particular, the heating device is formed as an electrically conductive coating.

German Patent Application Publication No. 10200405050163 describes a radiation-permeable plastic cover. This is provided for openings in vehicle bodies, in particular a radome which is permeable to electromagnetic rays such as radar beams, and has a body of transparent plastic with an outer face. The outer face depicts a pattern of contrasting colour in a radiator grille, or a company emblem. This company emblem is applied to a back face of the body opposite the outer face. The back side of the transparent body formed by moulding is back-moulded with a plastic mass over the surface, in particular over the full surface but with a space for the area provided for the pattern. Also, after application of a plastic body, a region of the pattern is fixedly bonded to the body formed by the plastic mass by injection-moulding of a plastic material.

European Patent Publication No. 190290261 describes a cover element for an opening of a vehicle which has an at least partially metallised film, wherein the firm has a sandwich structure with an upper and a lower cover layer, in particular an upper and a lower plastic layer, and a metallic layer embedded in between, wherein the film protects the metallic layer with its sandwich structure, and wherein the at least partly metallised film is over-moulded on a front side with a layer of the first plastic and is back-moulded on a back side with a cover layer of the second plastic.

European Patent Application Publication No. 1646266A2 discloses a body part for a motor vehicle and a heating device for the body part which is assigned to a radar sensor. However, a polymer heating film with integrated conductor tracks in the form of meanders is used as the heating device here. After production, the heating film may be applied to the bumper of the vehicle.

German Patent Application Publication No. 10149337A1 describes a component for a sensor which is heated. Heating wires are used. This is not an integrated solution which is integrated in a bumper or impact strip made of plastic, and not a solution which uses a planar, electrically conductive layer.

SUMMARY

This section provides a general summary of the disclosure, and is not a comprehensive disclosure of its full scope or all of its features.

It is an object of the invention to provide a durable cover element for an opening of the vehicle, which is easy to produce and performs the complete functions for covering a radar sensor.

The object is achieved with a cover element for a radome in a vehicle, having an at least partially metallised film which is over-moulded on a front side with a layer of a first plastic and back-moulded on a back side with a cover layer of a second plastic, wherein a heating element is provided on the back side or front side of the at least partially metallised film.

Due to the highly integrated solution for a cover element, production is simplified and above all assembly is optimised.

It is advantageous that the film is printed and deep-drawn.

In a preferred embodiment, the printing contains either inks and/or metallic structures or at least one metallic surface. Thus the cover element can be adapted both to aesthetic requirements and to the requirement for heating the cover element.

In a further preferred embodiment, the film comprises a sandwich structure with an upper and a lower covering layer, in particular an upper and a lower plastic layer, and a metallic film embedded in between, wherein the film by its sandwich structure protects the metallic layer, and at least one of the plastic layers comprises a metallic heating grid or a metallic planar heater.

In a further embodiment of the cover element, the heating element is moulded in when the metallised film is back-moulded.

In one embodiment, the metallised film is glued to a further film on which the heating lines are present.

It is advantageous if the first plastic on the front side is transparent.

The object is achieved by a method for production of a cover element for an opening of a vehicle, wherein a front side of an at least partially metallised film is over-moulded with a first plastic so as to form a bond, and a back side of this film is back-moulded with a second plastic so as to form a bond, wherein at least one heating element is also moulded in.

Here it is advantageous that, before being over-moulded with the first plastic and before back-moulding with the second plastic, the film is printed with a pattern by application of ink, and the film is deformed by a deep-drawing process to provide a three-dimensional structure, wherein the printing takes place with ink and/or with a metallic structure or surface.

Advantageously, the heating element is bonded to the film during over-moulding.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. The invention is shown diagrammatically in the drawing in relation to exemplary embodiments, and described in detail below with reference to the drawing. The figures are described cohesively and generally, wherein the same reference signs designate the same components.

Figure 1B:
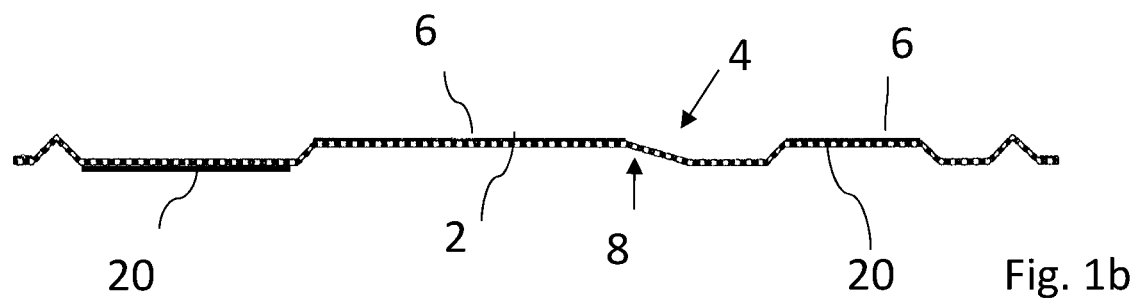
Figure 1C:
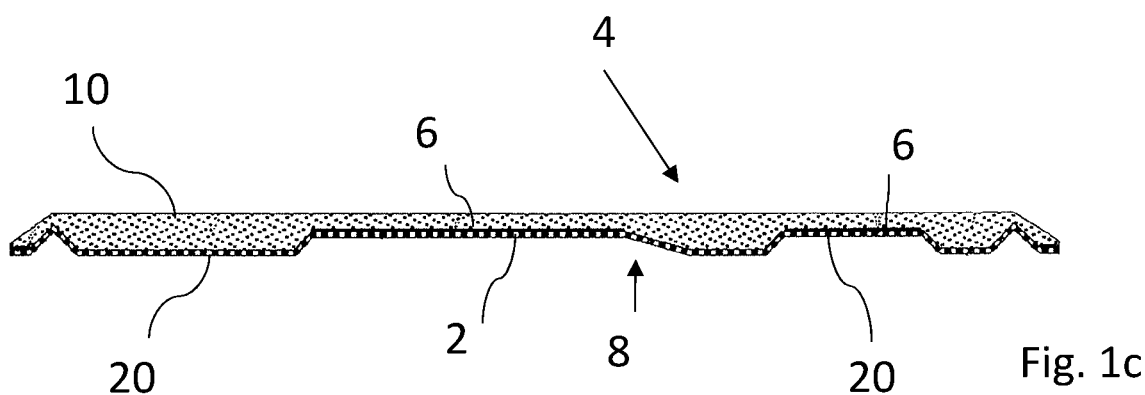
Figure 1D:
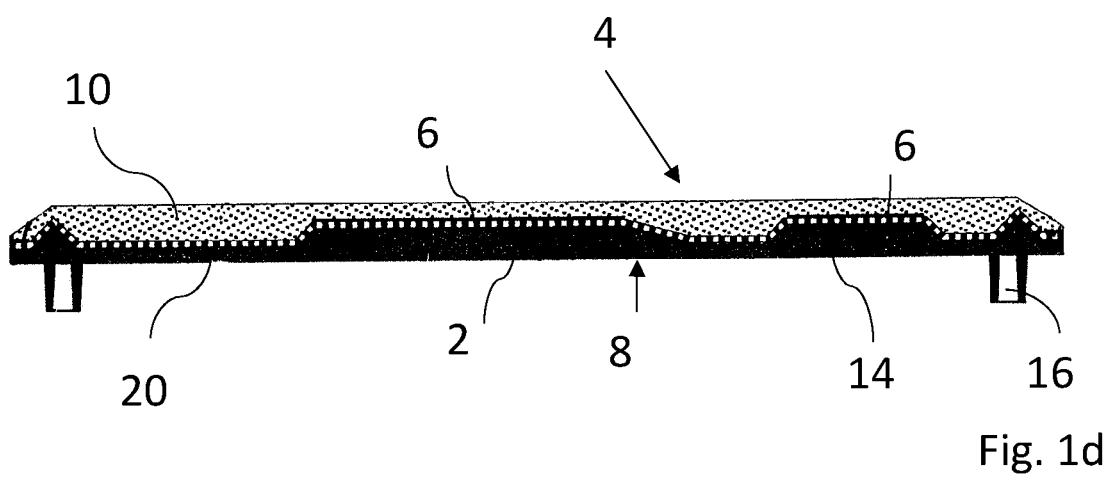
Figure 2B:
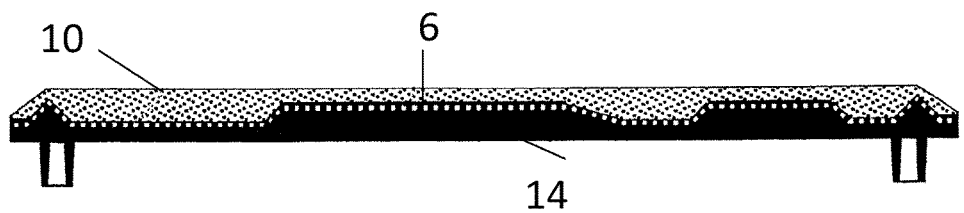
Figure 2A:
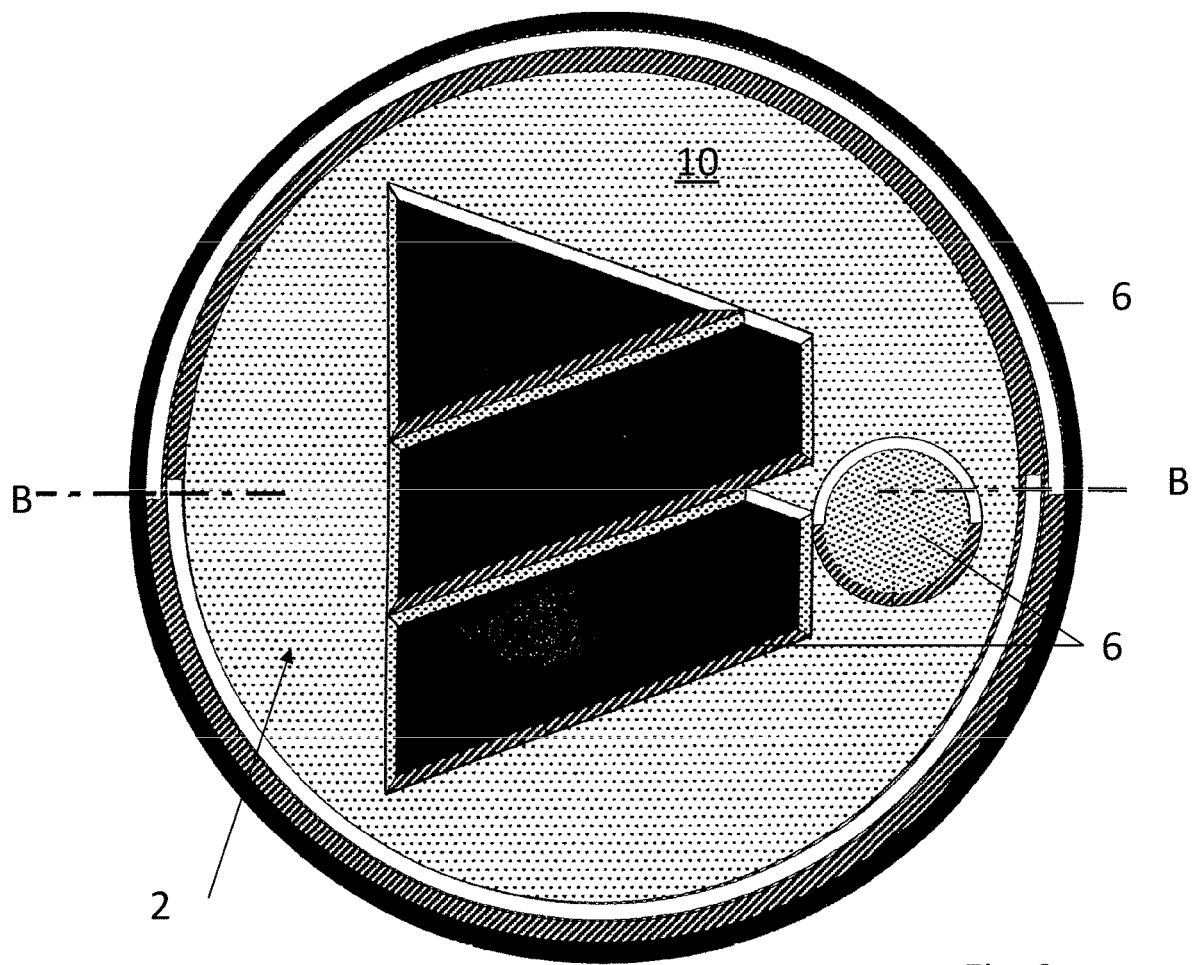
Figure 3:
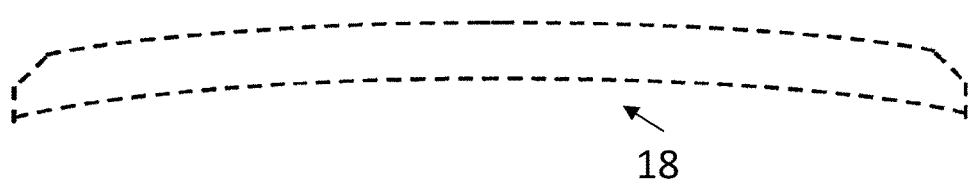
Figure 4:
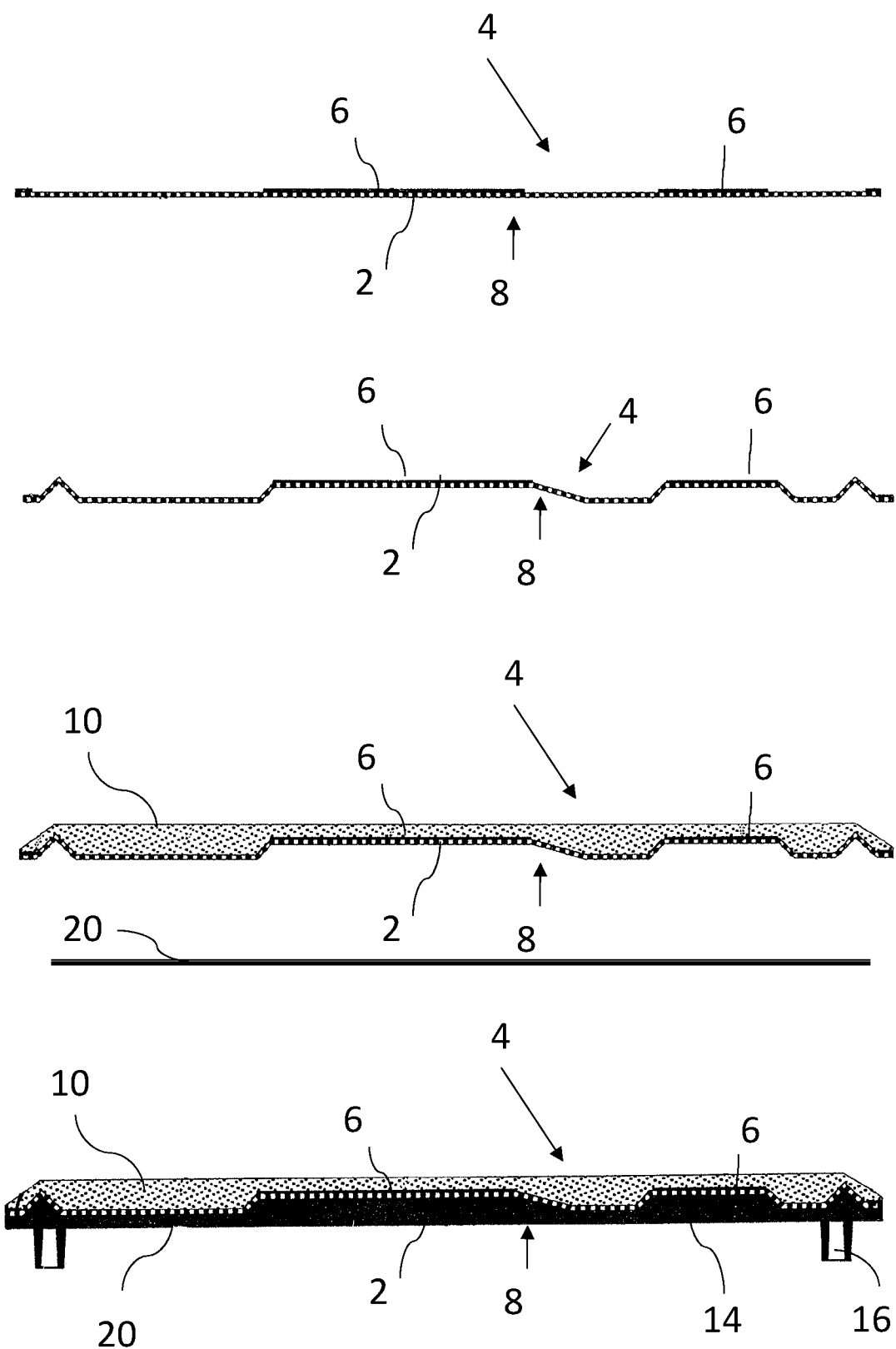

FIGS. 1a through 1d diagrammatically depict a first embodiment of a cover element according to the invention, in an embodiment of a method for production of this cover element;

FIGS. 2a and 2b depict the cover element according to the invention, produced using the method depicted in FIG. 1, in a front view and in a sectional view;

FIG. 3 diagrammatically depicts a variant for forming a cover element according to the invention; and FIG. 4 depicts another embodiment of the cover element.

Corresponding reference numerals indicate corresponding parts throughout the several views of the drawings.

DETAILED DESCRIPTION

Example embodiments will now be described more fully with reference to the accompanying drawings.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The individual steps for production of an embodiment of the cover element according to one embodiment of the method are depicted diagrammatically in FIG. 1a, FIG. 1b, FIG. 1c and FIG. 1d.

FIG. 1a shows a metallised film 2 formed from two plastic layers, between which a metallic layer is at least partially embedded.

In a first embodiment, one of the plastic layers carries heating lines. These are either vapour-deposited or printed onto the film. The heating lines are applied in the form of meanders, wherein the spacing between the individual lines is selected such that the radar signal is not disrupted.

Alternatively, one of the plastic layers is used as a carrier for a heating element 20 which is applied on a separate film.

This heating film is bonded to the metallised film 2, in the simplest case glued.

As an alternative to the use of heating lines, it is conceivable to use heating surfaces as planar heaters.

A front side 4 of this metallised film 2 is printed in places with ink 6 during production, so that as a whole, a pattern is provided on the front side 4.

Because of this printing with the ink 6, which is black in this case, the visible front side 4 is accordingly at least partially coloured. A back side 8 of the film 2 remains unprinted in this embodiment.

In one embodiment, the printing could be regarded as purely artistic. However, a heating element 20 may be applied by printing, additionally or as the only printing.

FIG. 1b shows the arrangement already shown in FIG. 1a, comprising the film 2 with the applied ink 6 and/or the heating element, after performance of a deep-drawing process. This deep-drawing process deforms the film 2 such that in the cross-section depicted, it now has a profile or relief. In the present embodiment, this ensures that the individual regions on which the ink 6 is applied to the film 2 are delimited from adjacent regions by raised profile portions in the inner regions of the film 2, and by recessed profile portions at the edge regions of the film 2.

For cover elements which are greatly deformed in the deep-drawing process, in some cases printing with a heating element follows the deep-drawing process. In this case, the film 2 is first deep-drawn and only after the three-dimensional shaping is it printed with the heating conductors or heating surface.

FIG. 1c shows the arrangement after over-moulding of the front side 4 of the film 2, and the ink 6 applied to the front side 4, with a layer of a first transparent plastic 10 formed from polycarbonate. This over-moulding is performed such that a surface of the layer of the first plastic 10 is particularly smooth and even.

FIG. 1d shows in a diagrammatic, sectional depiction a first embodiment of the cover element 12 according to the invention, as provided after a final step of production. In this final step, the back side 8 of the film 2 is back-moulded to provide a cover layer which, in the present embodiment, is formed from a second plastic 14 made from black polycarbonate. Here, in addition fixing elements 16 are integrated in this cover layer made of the black second plastic 14 on the back side 8 of the film 2.

During this production step, in a further embodiment according to FIG. 4, a heating element may be integrated. A heating film as a heating element 20 may be laid on the inside of the film 2 and moulded in.

FIG. 2a shows a top view of the cover element 12 produced using the method depicted in FIG. 1. FIG. 2b shows the cover element 12 along section line B-B from FIG. 2a, wherein this depiction corresponds to the depiction in FIG. 1d.

The present embodiment of the cover element 12 has an emblem or depicts such an emblem by means of its coloured pattern. This emblem is visually emphasised by the ink 6 applied to the front side 4 of the film 2, wherein the ink 6 is depicted in FIG. 2b by black regions and regions of dense dots. Unprinted regions of the front side 4 of the film 2 are here shown with dots of lower density. The regions of the front side 4 printed with the ink 6 and the unprinted regions of the front side 4 of the film 2 are visually clearly evident through the transparent first plastic 10 applied to the front side 4. Accordingly, in the present exemplary embodiment, the front side 4 of the film 2 is printed with the black ink 6 in different densities.

FIG. 3 shows diagrammatically a second embodiment of a cover element 18 which in this case is convex, but which comprises the same components (not shown here) as the first embodiment of the cover element 12 shown in FIG. 1 and FIG. 2, and which is also formed evenly or smooth on a front face.

The cover element is provided for an opening of a vehicle and has an at least partially metallised film which is over-moulded on a front side with a layer of the first plastic, and back-moulded on a back side with a cover layer of the second plastic. The film also comprises a sandwich structure with an upper and a lower covering or protective layer, in particular a plastic layer and/or paint layer, and a metallic layer embedded between these two cover layers. It is provided that because of its sandwich structure or sandwich form, the film protects the metallic or metallised layer. This structure is suitable for protecting a further layer or a further film comprising the heating element.

This cover element is provided to cover a radome to be arranged in the opening.

Also, the cover element is formed as an emblem for the vehicle, as for example formed prominently in the centre of a radiator grille. As an example, polycarbonate (PC) may be used for moulding or for over-moulding and/or back-moulding the film. Because in particular polycarbonate is used as the plastic for both layers, i.e. the layer on the top side and the cover layer, and for example polycarbonate is provided for the film, a good connection is achieved between the individual layers and the film. In particular, the first plastic provided for over-moulding the front side of the film is at least partially visually transparent, so that a pattern depicted by the metallised film is visible from the outside.

Usually, the layer on the front side of the film, the cover layer on the back side of the film and the two plastic layers of the film are formed from the same plastic or are materially based on the same plastic, in order to achieve a connection. Due to the embedding of the metallic layer, this is protected from damage during the subsequent method steps, in particular the injection-moulding. Because of the temperature stability necessary for this, for example polycarbonate and polycarbonate-based plastics are used. Also, a suitable painting of the metallised side of the film may fulfil the requirement, if at the same time a good adhesion to the cover layer is achieved.

The two plastic layers of the film may in particular be formed from polycarbonate. The thin metallic layer between the plastic layers is made from metal, e.g. chromium. The film of the cover element may for example be made from Makrofol® DPF 5072 by Bayer AG.

Because the plastic to be moulded onto the film from both sides and the two plastic layers of the film are formed from polycarbonate or are at least materially based thereon, overall a largely homogenous and integral cover element is provided.

The metallic layer of the film has a thickness of a few microns, such as of the order of 2 microns. The thickness of the metallic layer is selected such that it is transparent to electromagnetic waves and at the same time has a metallic appearance.

It may furthermore be provided that at least one fixing element is integrated in the cover layer of the cover element on the back side. By means of this at least one fixing element, it is possible to arrange or fix the cover element on an opening of a body or outer wall. It may also be provided that the cover element is provided as an insert in the opening.

In the method according to the invention for producing a cover element for an opening of a vehicle, a front side of an at least partially metallised film, which comprises a sandwich structure with an upper and a lower cover layer of plastic and a metallic layer embedded in between, wherein the film with its sandwich structure protects the metallic layer, is over-moulded with a first plastic so as to form a bond and a back side of this film is back-moulded with a second plastic so as to form a bond.

Furthermore, before injection-moulding, i.e. before the front side is over-moulded and before the back side is back-moulded, the film may be printed with a pattern at least on the front side of the film by application of a suitable ink or printing ink, e.g. black ink. To provide a three-dimensional structure of the film, this may be deformed by a deep-drawing process or by thermoforming.

During production of the cover element, the film may be provided as a rolled product. From such a rolled product, film pieces of suitable size for the cover element may be provided, and produced in particular by cutting or punching. Thus it is possible also to use ready-made decor films as rolled products and thus guarantee a particularly favourable production process of the cover element. It may also be provided to provide the film as a metallised semifinished product, whereby costs for production of the cover element may be further reduced.

Also, it is regularly provided that at least the layer for the front side of the film is injection-moulded at least with the first plastic by means of an in-mould film technique. The back side of the film is furthermore back-moulded to provide a cover layer formed from the second plastic and configured as a formed part. In addition, after injection-moulding, i.e. over-moulding and back-moulding, a hard coating may be applied to the cover element.

In a variant for production of the cover element, a bond is formed between individual layers, i.e. the layer of the first plastic on the front side and the cover layer of the second plastic, and the corresponding plastic layers of the film. This is possible since both the moulded plastic layers and the corresponding plastic layers of the film are made from the same plastic or are at least materially based on the same plastic. By suitable structure of the cover element, formation of a gap within the cover element due to temperature change can be avoided. The first and second plastic and the plastic layers of the film are in particular made of polycarbonate (PC). Alternatively, the use of PMMA or further transparent plastics as possible.

The first and the second plastic differ solely in their colouration, wherein the first plastic is transparent in the optically visible range of the electromagnetic spectrum, and hence clear. In contrast to the first plastic, the second plastic may have an opaque or black colouring added, wherein the colour is selected such that with regard to their material— usually also chemical and/or physical—composition or properties, the two plastics ideally do not differ from each other.

Due to the material bond of film and cover layers, formation of a gap, as usually occurs with similar cover elements known from the prior art, is avoided. Also, a low damping of the electromagnetic radiation, which remains constant from part to part, is achieved. By avoiding gap formation, furthermore evacuation and sealing of a cavity formed in production of the cover element are no longer necessary.

Thus with the invention, a cover element or cover is provided which is made from a composite of a plastic with layers differing purely in colour. This cover element serves typically as an insert or attachment for openings in vehicle bodies, and in particular in a radiator-protection grille, which must cover a device for distance measurement by means of electromagnetic radiation, in particular a radar sensor. With the design of the cover element according to the invention, it is guaranteed that this is sufficiently transparent and hence permeable to electromagnetic radiation to allow the distance measurement.

The method for producing the cover element or radome can be implemented in few production steps. Also with this method, as a whole a cover element is provided which is formed as an integral component without gap formation.

To produce the one-piece cover element from plastic which is permeable to electromagnetic rays, usually the decorative metallised film with plastic surface on both sides, e.g. Makrofol® DPF 5072 from Bayer AG, or with similar protection for the metallised layer, is over-moulded on the front side with a transparent first plastic, in particular polycarbonate, as the outer surface. The back side of this film is back-moulded with a cover layer from a coloured second plastic, in particular polycarbonate.

Furthermore, on the top side the decorative film may be printed with a pattern made from ink or dye or printing ink, e.g. by the company Proell, wherein this pattern at least partially covers a metallised surface on the film on the inside of the film.

By deforming the partially printed film, a three-dimensional form and hence a profile or relief for the film is produced, which is over-moulded with the transparent first plastic in a further step using an in-mould film technique. The front side of the film forms a bond with a transparent formed part made from the first plastic. The cover layer of plastic or paint protects the metallised layer in the interior of the film. In an additional step, the decorative profile of the film, produced in the first step on the unprinted back side, is back-moulded with a formed part of the second plastic. The back side of the film thus establishes a bond with a second formed part produced by back-moulding.

During the injection-moulding process, the cover layer of plastic protects the metallised layer in the interior of the film.

With such a cover element, it is possible to protect a radar antenna for the vehicle. Such radar antennas, and hence cover elements provided for covering these, are arranged for example in a bumper or in a radiator-protection grille.

Usually, the cover element has a constant thickness. Also, the cover element is produced and/or configured such that the layer of the first plastic on the front side of the cover element is particularly flat and smooth, i.e. free from unevenness.

A film provided for the cover element has a thickness of 200 to 400 microns, in particular 375 microns, wherein the metal layer embedded between the plastic layers has a thickness of approximately 2 microns and is therefore sufficiently thin to be permeable to the electromagnetic waves to be detected by the device for distance measurement. The film may be given a relief-like form for example by thermoforming or high-pressure forming. Also, a UV-resistant, translucent layer of resin may be applied to the cover element on the opposite side of the transparent layer. Furthermore, inside the cover element, a heating film of silver ink or corresponding heating coils or heating wires may be printed. The cover layer on the back side is normally black so that the heating film can be glued onto this cover layer. Furthermore, it is provided that the cover element has a damping of less than 1.8 dB, so that the cover layer is in particular sufficiently permeable to radar beams.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cover element for covering a radome in a vehicle, the cover element comprising:

a partially metallised film including a first plastic layer, a second plastic layer, and a metallic layer at least partially embedded between the first and second plastic layers;

a third plastic layer over-moulded over one of the first or second plastic layers of the metallised film;

a fourth plastic layer back-moulded over the other of the first or second plastic layer of the metallised film; and a heating element integrated into at least one of the first or second plastic layers of the metallised film.

2. The cover element according to claim 1, wherein the metallised film includes a printing and the metallised film is deep-drawn.

3. The cover element according to claim 2, wherein the printing contains either inks and/or metallic structures or at least one metallic surface.

4. The cover element according to claim 3, wherein the metallic surfaces or structures are configured to conduct heat.

5. The cover element according to claim 1, wherein the heating element is a metallic heating grid or a metallic planar heater.

6. The cover element according to claim 1, wherein the heating element is moulded into the at least one of the first or second plastic layers of the metallised film when the metallised film is back-moulded with the fourth plastic layer.

7. The cover element according to claim 1, wherein the heating element is integrated into the at least one of the first or second plastic layers of the metallised film by vapour-deposition, printing, or moulding.

8. The cover element according to claim 1, wherein the cover element is configured as an emblem for the vehicle.

9. The cover element according to claim 1, wherein the third plastic layer is transparent.

10. The cover element according to claim 1, wherein fixing elements are integrated in the fourth plastic layer for arranging or fixing the cover element on an opening of a body or an outer wall of the vehicle.

11. A method for production of a cover element for covering a radome on a vehicle, the method comprising:

providing an at least partially metallised film, wherein the film comprises a metallic layer embedded between a first plastic layer and a second plastic layer;

integrating a heating element into at least one of the first and second plastic layers;

over-moulding a third plastic layer over one of the first or second plastic layers of the metallised film so as to form a bond; and back-moulding a fourth plastic layer over one of the first or second plastic layers of the metallised film opposite to the first surface of the metallised film so as to form a bond.

12. The method according to claim 11, wherein prior to over-moulding the third plastic layer and prior to back-moulding the fourth plastic layer, the method includes printing the film with a pattern by application of ink, and/or with a metallic structure or surface; and deforming the film by a deep-drawing process to provide a three-dimensional structure.

13. The method according to claim 11, wherein the over-moulding of the third plastic layer and the back-moulding of the fourth plastic layer over the film is accomplished by an in-mould filming technique.

14. The method according to claim 11, wherein a heating element is bonded to the film during over-moulding of the third plastic layer.

15. The method according to claim 11, further including integrating fixing elements in the fourth plastic layer for arranging or fixing the cover element on an opening of a body or an outer wall.

16. The method according to claim 11, wherein the heating element is integrated into the one of the first or second plastic layers prior to over-moulding the third plastic layer and back-moulding the fourth plastic layer.

17. The method according to claim 11, wherein the heating element is a metallic grid or a planar heater.

18. A cover element for covering a radome in a vehicle, comprising:

a metallised film including a first plastic layer and a metallic layer at least partially embedded between the first plastic layer and the second plastic layer;

a first covering layer, wherein the first covering layer is over-moulded on a first surface of the metallised film and forms a bond with the first plastic layer;

a second covering layer, wherein the second covering layer is back-moulded on a second surface of the metallised film opposite the first surface of the metallised film and forms a bond with the second plastic layer;

a heating element integrated into at least one of the first plastic layer and the second plastic layer.

19. The cover element of claim 18, wherein the heating element is a metallic heating grid or a metallic planar heater.

20. The cover element of claim 18, wherein the heating element is integrated into the at least one of the first or second plastic layers of the metallised film by vapour-deposition, printing, or moulding.

* * * * *